United States Patent
Bai et al.

(10) Patent No.: US 11,694,405 B2
(45) Date of Patent: Jul. 4, 2023

(54) METHOD FOR DISPLAYING ANNOTATION INFORMATION, ELECTRONIC DEVICE AND STORAGE MEDIUM

(71) Applicant: Beijing Baidu Netcom Science Technology Co., Ltd., Beijing (CN)

(72) Inventors: Guocai Bai, Beijing (CN); Jiankang Xin, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/492,646

(22) Filed: Oct. 3, 2021

(65) Prior Publication Data

US 2022/0020216 A1 Jan. 20, 2022

(30) Foreign Application Priority Data

Dec. 18, 2020 (CN) .......................... 202011507033.7

(51) Int. Cl.
*G06T 19/00* (2011.01)
*G06T 7/50* (2017.01)
(Continued)

(52) U.S. Cl.
CPC .............. *G06T 19/00* (2013.01); *G06T 7/50* (2017.01); *G06V 10/22* (2022.01); *G06V 10/40* (2022.01);
(Continued)

(58) Field of Classification Search
None
See application file for complete search history.

(56) References Cited

U.S. PATENT DOCUMENTS 10,127,637 B2 * 11/2018 Kim ...................... G06T 5/006
10,785,413 B2 * 9/2020 Malia ................ H04N 5/23216
(Continued)

FOREIGN PATENT DOCUMENTS

| CN | 104680532 A | 6/2015 |
|---|---|---|
| CN | 106503653 A | 3/2017 |

(Continued)

OTHER PUBLICATIONS

The State Intellectual Property Office of People's Rebulic of China; Chinese Office Action and Search Report; Chinese Application No. 2020115070337; dated Sep. 13, 2022; 12 pages.

*Primary Examiner* — Saptarshi Mazumder
(74) *Attorney, Agent, or Firm* — Faegre Drinker Biddle & Reath LLP (57) ABSTRACT

A method for displaying annotation information, an electronic device and a storage medium, related to the field of computers and image information processing, are provided. The method includes: acquiring depth information and annotation information of a target region in a first image at a first angle of view; establishing an association relationship between the depth information and the annotation information; and in a case that a second image at a second angle of view is acquired, determining a display region of the target region in the second image based on the depth information, and displaying, in the display region in the second image, the annotation information of the target region based on the association relationship. Thereby, the cross-image display of the annotation information of the target region with the depth information can be realized.

12 Claims, 8 Drawing Sheets

(51) Int. Cl.
*G06V 10/22* (2022.01)
*G06V 10/40* (2022.01)
*G06V 30/10* (2022.01)

(52) U.S. Cl.
CPC ........ *G06T 2219/004* (2013.01); *G06V 30/10* (2022.01)

(56) References Cited

U.S. PATENT DOCUMENTS

| | | |
|---|---|---|
| 2013/0155181 A1 | 6/2013 | Williams et al. |
| 2020/0205692 A1* | 7/2020 | Chauffert ............... A61B 5/055 |

FOREIGN PATENT DOCUMENTS

| | | |
|---|---|---|
| CN | 109658504 A | 4/2019 |
| CN | 110991491 A | 4/2020 |
| CN | 111028362 A | 4/2020 |
| CN | 111291813 A | 6/2020 |

* cited by examiner

METHOD FOR DISPLAYING ANNOTATION INFORMATION, ELECTRONIC DEVICE AND STORAGE MEDIUM

CROSS-REFERENCE TO RELATED APPLICATION

This application claims priority to Chinese patent application No. 202011507033.7, filed on Dec. 18, 2020, which is hereby incorporated by reference in its entirety.

TECHNICAL FIELD

The present disclosure relates to the field of computer technology, in particular to the field of image information processing.

BACKGROUND

A panorama is an image formed by splicing one or more groups of photos shot by a camera at multiple angles, since the panorama can provide a 360-degree view and provide an omnibearing space display for a user, the panorama is widely used in products such as maps and the like. Displaying some annotation information such as a building, a road name, a user message and so on in the panorama can effectively improve the reading efficiency and experience of a user.

SUMMARY

The present disclosure provides a method and apparatus for displaying annotation information, an electronic device, a storage medium and a computer program product.

According to one aspect of the present disclosure, there is provided a method for displaying annotation information, including:

acquiring depth information and annotation information of a target region in a first image at a first angle of view;

establishing an association relationship between the depth information and the annotation information; and in a case that a second image at a second angle of view is acquired, determining a display region of the target region in the second image based on the depth information, and displaying, in the display region in the second image, the annotation information of the target region based on the association relationship.

According to another aspect of the present disclosure, there is provided an apparatus for displaying annotation information, including:

an acquisition module configured for acquiring depth information and annotation information of a target region in a first image at a first angle of view;

an establishment module configured for establishing an association relationship between the depth information and the annotation information; and a display module configured for, in a case that a second image at a second angle of view is acquired, determining a display region of the target region in the second image based on the depth information, and displaying, in the display region in the second image, the annotation information of the target region based on the association relationship.

According to another aspect of the present disclosure, there is provided an electronic device, including:

at least one processor; and a memory communicatively connected to the at least one processor;

wherein, the memory stores instructions executable by the at least one processor, the instructions being executed by the at least one processor to enable the at least one processor to perform the method of any one of the embodiments of the present disclosure.

According to another aspect of the present disclosure, there is provided a non-transitory computer-readable storage medium storing computer instructions for enabling a computer to perform the method of any one of the embodiments of the present disclosure.

According to another aspect of the present disclosure, there is provided a computer program product including computer programs which, when executed by a processor, cause the processor to perform the method of any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure.

Likewise, descriptions of well-known functions and structures are omitted in the following description for clarity and conciseness.

The term "and/or" used herein is merely an association relationship that describes associated objects, meaning that there may be three relationships. e.g., A and/or B, which may represent three cases of A existing alone, A and B existing simultaneously, and B existing alone. As used herein, the term "at least one" means any one of a variety or any combination of at least two of a variety. e.g., including at least one of A, B, and C, which may represent including any one or more elements selected from a group consisting of A, B. and C. The terms "first" and "second" used herein refer to and distinguish between a plurality of similar technical terms, and are not intended to be limiting in order or to define only two, e.g., a first feature and a second feature refer to two categories/two features, wherein the first feature may be one or more, and the second feature may also be one or more.

Furthermore, numerous specific details are provided in the following specific embodiments, in order to describe the present disclosure better. It will be understood by those skilled in the art that the present disclosure may be practiced without some of the specific details. In some instances, methods, means, elements, and circuits well known to those skilled in the art have not been described in detail, so as to highlight the subject matter of the present disclosure.

For a pure two-dimensional (2D) panorama, the present disclosure provides performing comprehensive mining of depth information on a part of the 2D panorama or an interested position of a user on the 2D panorama, annotation information in a region with the depth information may realize cross-image display, the high cost of three-dimensional reconstruction is effectively solved, and meanwhile inheritance display of annotation information of the interested position of the user in an adjacent panorama can be achieved.

The implementation of the present disclosure will be described in detail below in combination with the drawings, which are included for purposes of illustration only and are not intended to limit the present disclosure.

Figure 1:
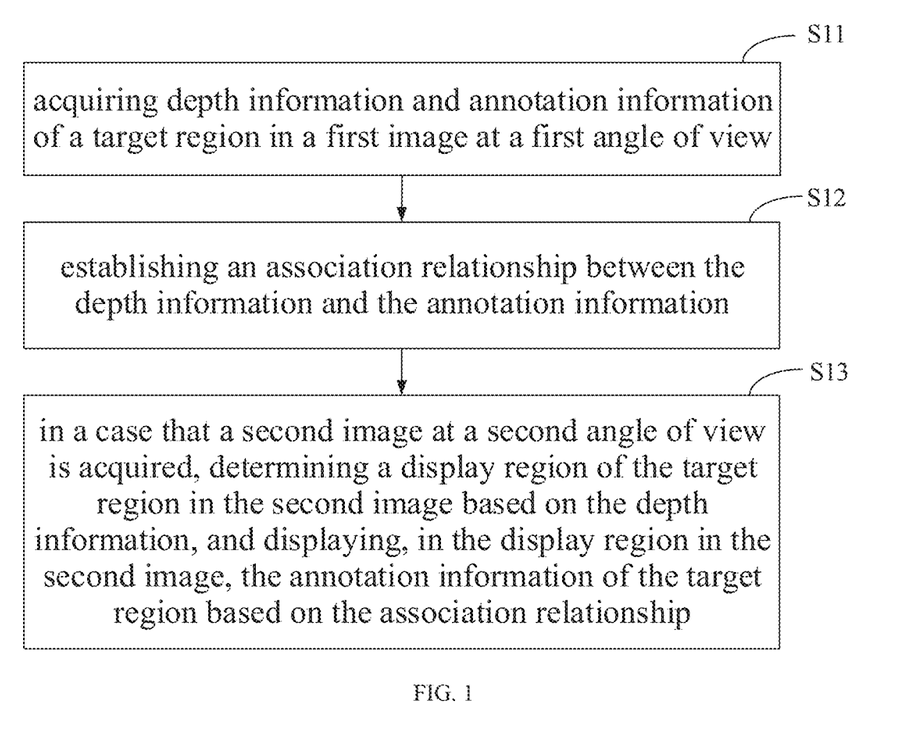
FIG. 1 is a first schematic diagram of a method for displaying annotation information according to one embodiment of the present disclosure.

FIG. 1 illustrates a schematic diagram of a method for displaying annotation information according to one embodiment of the present disclosure. The method may be applied to an electronic device, which may include, but is not limited to, a stationary device and/or a mobile device. For example, the stationary device, which may include, but is not limited to, a server, which may be a cloud server or a general server. For example, the mobile device may include, but is not limited to: one or more of a mobile phone and a tablet computer. As shown in FIG. 1, the method may include:

S11, acquiring depth information and annotation information of a target region in a first image at a first angle of view;

S12, establishing an association relationship between the depth information and the annotation information; and S13, in a case that a second image at a second angle of view is acquired, determining a display region of the target region in the second image based on the depth information, and displaying, in the display region in the second image, the annotation information of the target region based on the association relationship.

Here, both the first image and the second image may be a panorama. Both the first image and the second image may be a panorama with an aspect ratio of x:y. For example, x=2 and y=1. It should be noted that the present disclosure does not forcibly define the aspect ratio of the first image and the second image.

Here, both the first image and the second image may be captured by a camera such as a fish-eye camera. For example, the first image and the second image are panorama images including a target region taken by a camera at different angle of views, respectively. The present disclosure does not forcibly define the values of the first angle of view and the second angle of view.

It should be noted that the first image and the second image overlap at least in part, for example, the first image is an image taken by a photographer directly facing a square, and this image has a sculpture, a flower bed, and a sightseeing vehicle; and the second image is an image shot by a photographer on the square after the photographer rotates clockwise by 10 degrees in situ, and this image has the sculpture and the flower bed; obviously, the first image and the second image overlap at least in part.

Here, the target region is a region having depth information. For example, the region where a store is located, the region where the road sign is located, the region where the traffic light sign is located, or the like, in an image may be the target region.

Here, the depth information may include distance information between the geodetic coordinate of the target region and the collection coordinate of the first image. Here, the collection coordinate of the first image is the geodetic coordinate at which the photographer is located in a case that the first image is taken. Taking the store in the first image as an example, the depth information may include distance information between the geodetic coordinate of the store and the collection coordinate of the first image.

Further, the depth information may also include contour information of a region occupied by the target region in the first image. Taking the store in the first image as an example, the depth information may also include contour information of a region occupied by the store in the first image.

By means of the above embodiment, which regions in the first image are provided with depth information can be found out, based on these known depth information, some annotation information and the depth information are associated, and in a case of switching to other images, the positions of these regions with the depth information in a next image are inferred according to the depth information, so that data support is provided for realizing cross-image display of the annotation information.

Here, the association relationship may include a first mapping relationship between the annotation information and the depth information, for example, the annotation information and the depth information are in one-to-one correspondence, for example, the annotation information a1 corresponds to the depth information A1, and the annotation information a2 corresponds to the depth information A2. Alternatively, the association relationship may include a second mapping relationship between the depth information and the annotation information, for example, the depth information and the annotation information are in one-to-one correspondence, for example, the depth information B1 corresponds to the annotation information b1, and the depth information B2 corresponds to the annotation information b2.

Here, the annotation information may include a first type of annotation information and a second type of annotation information. Here, the first type of annotation information is used for representing POI information mined from the first image. For example, in a geographic information system, one POI may be one house, one shop, one post, one bus stop, etc. Here, the second type of annotation information is used for representing information added by a user under a ball model scene. For example, in a case that user A is browsing a panorama, user A sees a gate, and remembers that an old man who is looking at the gate is guarding with his pet dog and the pet dog is very cute, so user A adds a message to the location where the gate is located in the panorama: "This gate is guarded by an old man with a pet dog, and the old man's pet dog is very cute." This message information from user A belongs to an annotation message.

It should be noted that the second image may be a neighboring image of the first image and may also be an image spaced apart from the first image by a number of images.

According to the method for displaying annotation information, depth information and annotation information of a target region in a first image at a first angle of view are acquired; an association relationship between the depth information and the annotation information is established; in a case that a second image at a second angle of view is acquired, a display region of the target region in the second image is determined based on the depth information, and the annotation information of the target region is displayed in the display region based on the association relationship. In this way, in a case that the target region on the first image appears on the second image, the annotation information of the target region on the first image can be displayed on the second image according to the association relationship, thus the problem of less annotation information during panorama browsing can be effectively solved. In addition, the problem that the annotation information of the target region cannot be displayed on the second image due to the fact that the annotation information of the target region is annotated only on the first image but not on the second image is solved, the cross-image display of the annotation information of the target region with the depth information can be realized, and thus the map use experience of the user is improved. And, compared with an annotation manner adopting a three-dimensional reconstruction technology, the cross-image display problem of annotation information of a key position with depth information in a panorama can be solved at a low cost.

The target region is a region having depth information in the first image, that is, in the first image, some regions have depth information and some regions have no depth information, thus the target region is a local region in the first image. In some embodiments, a manner for determining the target region in the first image may be achieved by at least one of:

determining the target region based on an optical character recognition (OCR) algorithm;

determining the target region based on a preset image feature; and determining the target region based on message information of a user.

Herein, the determining the target region based on the OCR algorithm may include: performing character recognition based on OCR, to obtain a recognition result, and determining the position where a text sign is located as a target region in a case that the text in the recognition result are exactly matched with the POI information mined from the first image. For example, a "Qingfeng Steamed Dumpling Shop" in a certain sign is identified based on OCR, and in a case that the identification result is exactly matched with the POI information mined from the first image, the location where the sign is located is determined as the target region.

Through the above embodiment, the target region on the image can be automatically mined, so that the annotation information display efficiency is improved.

Herein, the determining the target region based on the preset image feature may include: determining a preset object, searching whether a preset image feature of the preset object exists in the first image, and determining the region where the preset image feature is located as the target region in a case that the preset image feature of the preset object exists in the first image. For example, a traffic light is searched based on a graphics processing unit (GPU), the traffic light is identified in a first image based on an image feature of the traffic light, and a region matching the image feature of the traffic light is determined as a target region in a case that the region is found.

Through the above embodiment, the target region on the image can be automatically mined, so that the annotation information display efficiency is improved.

Herein, the determining the target region based on the message information of the user may include: determining a message location of the message information of the user, and determining the target region based on the message location. For example, a user adds a line of text himself or herself at a certain location, and the location where the user adds a message is determined as a target region.

Through the above embodiment, the interested position of the user on a 2D image can be mined, so that the annotation experience of the user is improved.

In a practical application, how to determine the target region in the first image in particular may be accomplished in one or more of the manners described above. Of course, other manners that can determine the target area can also be used to determine the target area, which is not limited in the present disclosure.

In some embodiments, the determining the display region of the target region in the second image based on the depth information, in the case that the second image at the second angle of view is acquired, may include:

determining the display region of the target region on a ball model of the second image, based on collection coordinate information and collection orientation information of the first image and collection coordinate information and collection orientation information of the second image in combination with the depth information of the target region in the first image.

It should be noted that, in a case that the first image is switched to the second image, because the collection coordinate information and the collection orientation information of the first image and the second image are different, some target regions with depth information in the first image may not be present in the second image.

For example, in a case that an image A is switched to an image B, based on collection coordinates, orientations and other information of the image A and the image B, the display region annotated in the image B can be predicted by combining the annotation with the depth information of the image A, and then the corresponding coordinate of the image A on the ball model of the image B is calculated, so that the annotation cross-panoramic ball display is realized.

With the above embodiment, the display region of the target region on the ball model of the second image can be determined according to the depth information of the target region in the first image; because the collection directions and the collection positions of the first image and the second image may be different, the accuracy of the determined display region can be improved by combining the collection coordinate information and the collection orientation information of the first image and the second image, so that the accuracy of realizing cross-image display of annotation information with depth information is improved.

Figure 2:
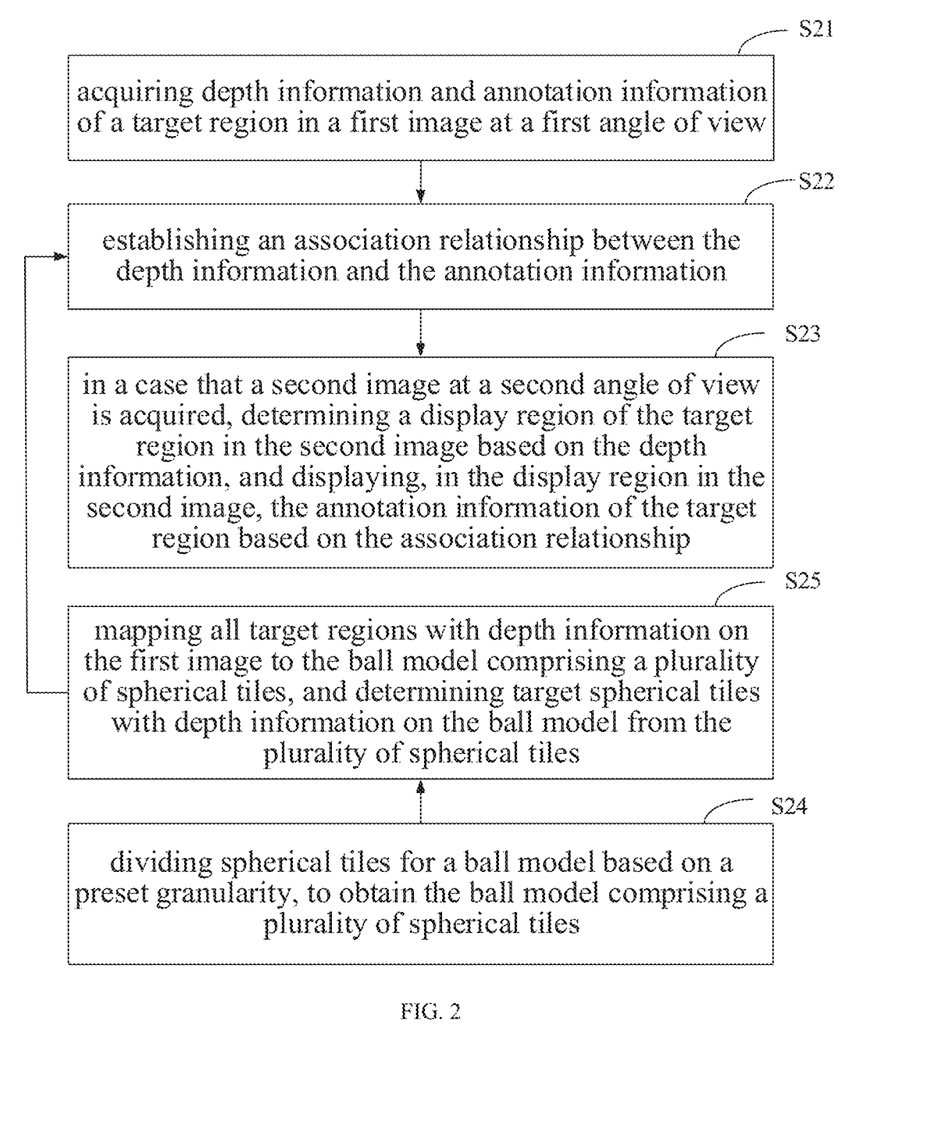
FIG. 2 is a second schematic diagram of a method for displaying annotation information according to one embodiment of the present disclosure.

In the embodiment of the present disclosure, on the basis of realizing any one of the above methods, as shown in FIG. 2, the method may further include:

S24: dividing spherical tiles for a ball model based on a preset granularity, to obtain the ball model including a plurality of spherical tiles; and S25: mapping all target regions with the depth information in the first image onto the ball model comprising the plurality of spherical tiles, and determining a target spherical tile with the depth information on the ball model from the plurality of spherical tiles.

S21, S22 and S23 shown in FIG. 2 are operations same as or similar to S11, S12 and S13 shown in FIG. 1, respectively.

Herein, the preset granularity may be set or adjusted according to business requirements. The larger the granularity is, the more the number of spherical tiles is, the more accurate the calculation is.

Through the above embodiment, the number of the tiles can be adjusted according to business requirements, so that the number of the target spherical tiles included in a case that the target region is mapped to the ball model can be adjusted, the display precision can be adjusted, and the effect of the cross-image display of annotation information is also facilitated to be adjusted.

In some embodiments, the establishing the association relationship between the depth information and the annotation information in S22, may include:

establishing the association relationship between a coordinate of the target spherical tile with the depth information and the annotation information corresponding to the depth information.

Herein, the coordinate of the target spherical tile may be the coordinate of the center point of the target spherical tile which may be represented by latitude and longitude values, such as (110, 60) representing a tile having a longitude of 110 degrees and a latitude of 60 degrees. Projection of a target region with depth information onto a sphere may cover several tiles, the tiles have the same depth, and a full set of tiles with depth information is obtained after projection of all regions with depth information is completed.

Through the above embodiment, the annotation and the region with the depth information can be associated under the ball model, so that the annotation information can be displayed under the panoramic ball model.

Figure 3:
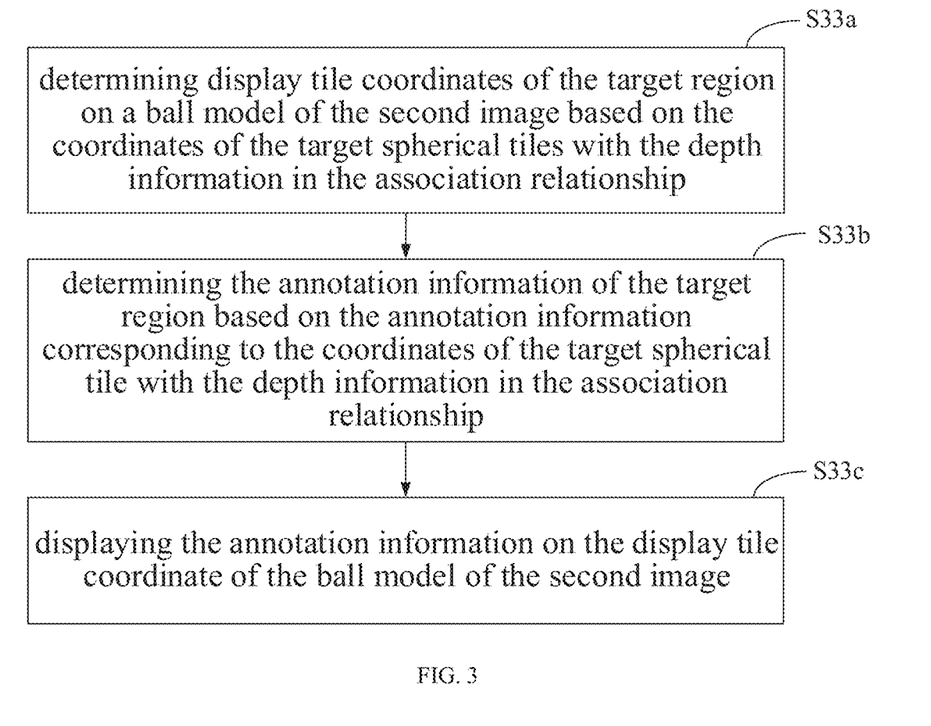
FIG. 3 is a schematic diagram of determining a display region of a target region in a second image based on depth information and displaying annotation information of the target region in the display region in an embodiment of the present disclosure.

Based on the technical scheme shown in FIG. 2, in some embodiments, as shown in FIG. 3, S23 may include:

S33a: determining a display tile coordinate of the target region on the ball model of the second image according to the coordinate of the target spherical tile with the depth information in the association relationship;

S33b: determining the annotation information of the target region according to the annotation information corresponding to the coordinate of the target spherical tile with the depth information in the association relationship; and S33c: displaying the annotation information on the display tile coordinate of the ball model of the second image.

Through the above embodiment, the cross-image display of the annotation information under the panoramic ball model can be achieved according to the association relationship between the coordinate of the target spherical tile with the depth information and the annotation information corresponding to the depth information.

Figure 4:
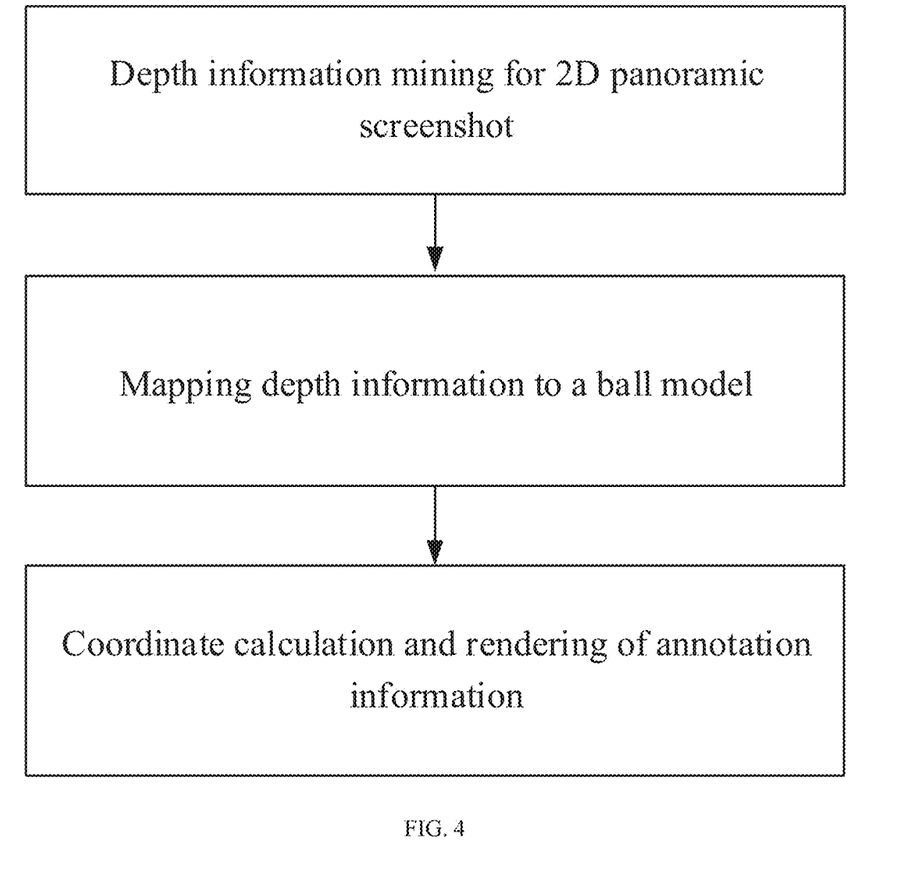
FIG. 4 is an architecture diagram displaying annotation information in an embodiment of the present disclosure.

FIG. 4 shows an architecture diagram of annotation information display. As shown in FIG. 4, the architecture may include three parts: the first part responsible for mining panoramic depth information for a 2D panoramic screenshot; the second part responsible for mapping depth information to a ball model; and the third part responsible for coordinate calculation and rendering of the annotation information.

For the first part, the 2D panoramic screenshot refers to the image of a panorama projected to a certain 2D plane after the ball model rendering. As long as an angle is set, a ball model can produce 2D plane projection at any angle. The panoramic depth information contains at least two pieces of information, one is distance information and the other is range information. The distance information refers to the distance between the true coordinate of a location in the panorama and the coordinate of the panorama itself, for example, there is a store in the panorama, and depth information may include distance information between the geodetic coordinate of the store and the geodetic coordinate of the panorama, as well as profile information of a region occupied by the store in the panorama.

Figure 5:
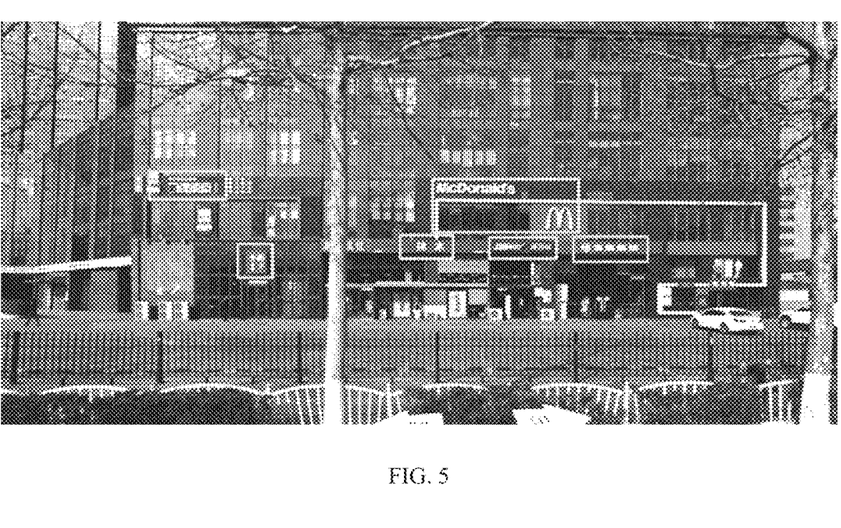
FIG. 5 is an example of a target region in a panorama in an embodiment of the present disclosure.

A panorama needing depth information mining is generally an image with an aspect ratio of 2:1, the original panorama is loaded and projected to a 2D plane with a specified angle under a ball model, and then, for the 2D plane projection image, a region with depth information is framed through an target detection algorithm or a manual annotation method, wherein the rectangular frames in FIG. 5 all belong to the region with depth information, and meanwhile, distance information is determined based on the frame selection range.

Figure 6:
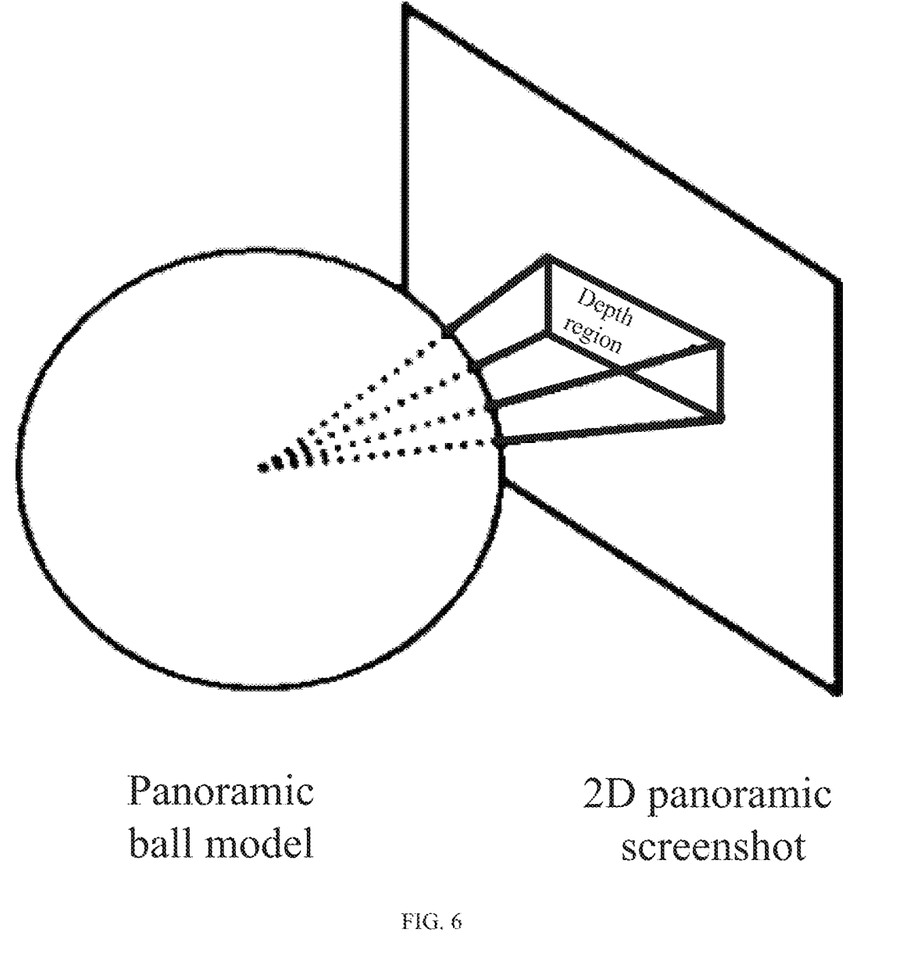
FIG. 6 is an example of a panoramic ball model projected onto a 2D plane according to one embodiment of the present disclosure.

For the second part, an example of a panoramic ball model projecting onto a 2D plane is shown in FIG. 6. As shown in FIG. 6, any point on a sphere can be projected onto a depth region of a 2D plane, and a rectangular region in the 2D plane can be mapped onto a region of the sphere by a projection algorithm. Under the scene that the panorama is rendered by adopting a ball model, the region with depth information mined out in the first part needs to be converted into the region under the ball model. Illustratively, spherical tiles are divided based on the granularity required by the business. The classic dividing manner is similar to a map segmentation method for latitude and longitude. The coordinate of the center point of each spherical tile is latitude and longitude values, for example, (120, 40) represents a tile having a longitude of 120 degrees and a latitude of 40 degrees. Projection of a region with depth information onto a sphere may cover several tiles, the tiles have the same depth, and a full set of tiles with depth information is obtained after projection of all regions with depth information is completed. In a case that an annotation is added under the ball model, assuming that the coordinate of the annotation is P1, P1 is converted from the ball model to the coordinate P2 in the 2D plane graph through a projection matrix, and the point-plane relationship between P2 and the depth region in the 2D plane graph is calculated to determine the depth of the P2 point, namely the depth of P1.

For the third part, there are at least two ways to generate an annotation. One is to directly associate with corresponding depth information region in a case of mining depth information, and the more common types of annotations are POI, a building name, a road sign, etc., and the other is added in a scene of a ball model, such as a user adding a message in a case of viewing a panoramic map.

For the first annotation type, the annotation is obtained from a 2D panorama, and the annotation is denoted as M1. Assuming that depth information D1 is mined out through panorama A, in a case that a depth region is mapped to a ball model, the projection coordinate annotated on the ball model can be directly obtained based on the mapping relationship of the 2:1 map and the ball model. Rendering and displaying can thus be performed directly on the corresponding coordinates/tiles of the ball model.

For the second annotation type, the annotation is added in the ball model, and the annotation is denoted as M2, the depth region mapped on the ball model in advance is associating with the annotation, and annotation depth information is given.

In a case that the panorama A is switched to the panorama B, based on collection coordinates, collection orientations and other information of the panorama A and the panorama B, the depth region annotated in the 2:1 panorama of the panorama B can be predicted by combining the annotation with the depth information of the panorama A, and then the corresponding coordinate of the panorama A on the ball model of the panorama B is calculated, so that the annotation cross-panoramic ball display is realized.

It should be understood that the architecture diagram shown in FIG. 4 is an optional specific implementation, and those skilled in the art can make various obvious changes and/or substitutions based on the example in FIG. 4, and the obtained technical solution still belongs to the scope of the embodiments of the present disclosure.

The method for displaying annotation information provided by the present disclosure may be used for map or map panorama and other items. Illustratively, the execution subject of the method may be an electronic device which may be various map processing devices, such as a map street view server.

Figure 7:
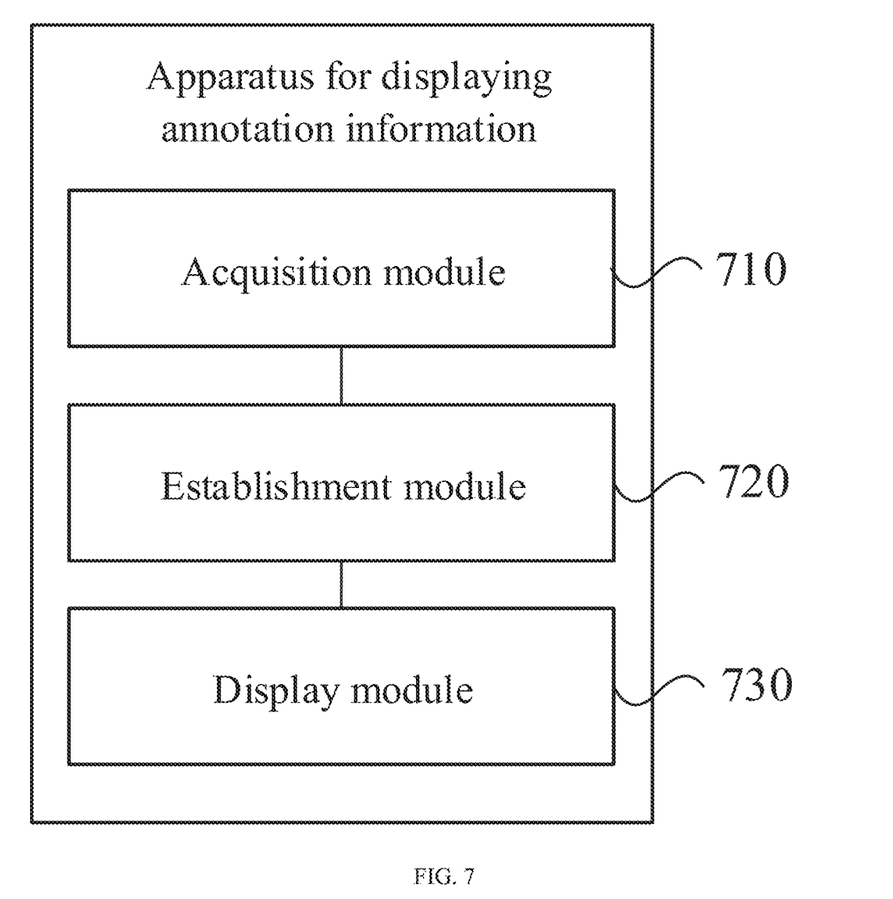
FIG. 7 is a schematic diagram of an apparatus for displaying annotation information according to one embodiment of the present disclosure.

As an implementation of the above methods, the present disclosure also provides an apparatus for displaying annotation information. FIG. 7 shows a schematic diagram of an apparatus for displaying annotation information. As shown in FIG. 7, the apparatus may include:

an acquisition module 710 configured for acquiring depth information and annotation information of a target region in a first image at a first angle of view;

an establishment module 720 configured for establishing an association relationship between the depth information and the annotation information; and a display module 730 configured for, in a case that a second image at a second angle of view is acquired, determining a display region of the target region in the second image based on the depth information, and displaying, in the display region in the second image, the annotation information of the target region based on the association relationship.

Herein, the depth information may include:

distance information between a geodetic coordinate of the target region and a collection coordinate of the first image; and contour information of a region occupied by the target region in the first image.

Figure 8:
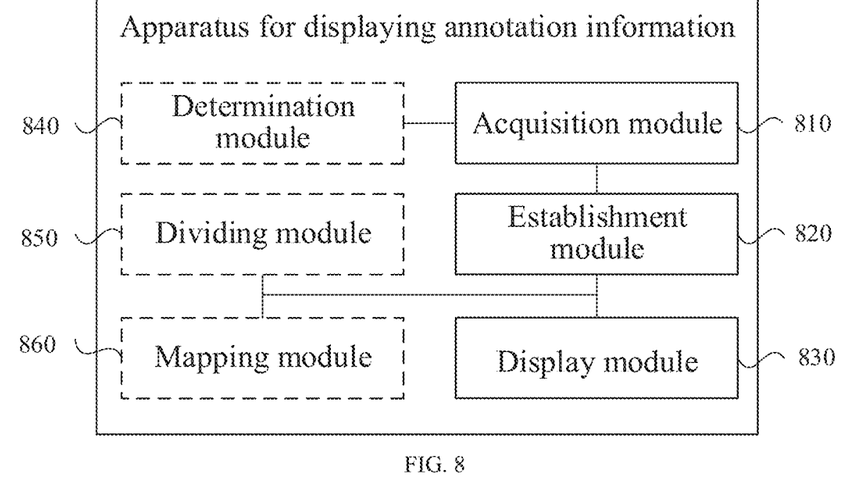
FIG. 8 is a schematic diagram of an apparatus for displaying annotation information according to another embodiment of the present disclosure.

In some embodiments, as shown in FIG. 8, the apparatus may further include:

a determination module 840 configured for determining the target region in the first image;

wherein the determination module determines a manner for determining the target region in the first image, which may include at least one of:

determining the target region based on an optical character recognition algorithm:

determining the target region based on a preset image feature; and determining the target region based on message information of a user.

An acquisition module 810, an establishment module 820 and a display module 830 shown in FIG. 8 are modules same as or similar to the acquisition module 710, the establishment module 720 and the display module 730 shown in FIG. 7, respectively.

In some embodiments, the display module 830 may be configured for:

determining the display region of the target region on a ball model of the second image, based on collection coordinate information and collection orientation information of the first image and collection coordinate information and collection orientation information of the second image in combination with the depth information of the target region.

In some embodiments, as shown in FIG. 8, the apparatus may further include:

a dividing module 850 configured for dividing spherical tiles for a ball model based on a preset granularity, to obtain the ball model including a plurality of spherical tiles; and a mapping module 860 configured for mapping all target regions with the depth information in the first image onto the ball model including the plurality of spherical tiles, and determining a target spherical tile with the depth information from the plurality of spherical tiles:

the establishment module may be configured for:

establishing the association relationship between a coordinate of the target spherical tile with the depth information and the annotation information corresponding to the depth information.

In some embodiments, the display module 830 may be configured for:

determining a display tile coordinate of the target region on the ball model of the second image according to the coordinate of the target spherical tile with the depth information in the association relationship;

determining the annotation information to be displayed on the ball model of the second image, of the target region, according to the annotation information corresponding to the coordinate of the target spherical tile with the depth information in the association relationship; and rendering and displaying the annotation information on the display tile coordinate of the ball model of the second image.

According to the apparatus for displaying annotation information provided by the embodiment, in a case where the target region on the first image appears on the second image, the annotation information of the target region on the first image can be displayed on the second image according to the association relationship, thus the problem of less annotation information during panorama browsing can be effectively solved. Compared with an annotation manner adopting a three-dimensional reconstruction technology, the cross-image display problem of annotation information of key positions with depth information in the panorama can be solved at a low cost.

According to embodiments of the present disclosure, the present disclosure also provides an electronic device and a readable storage medium.

Figure 9:
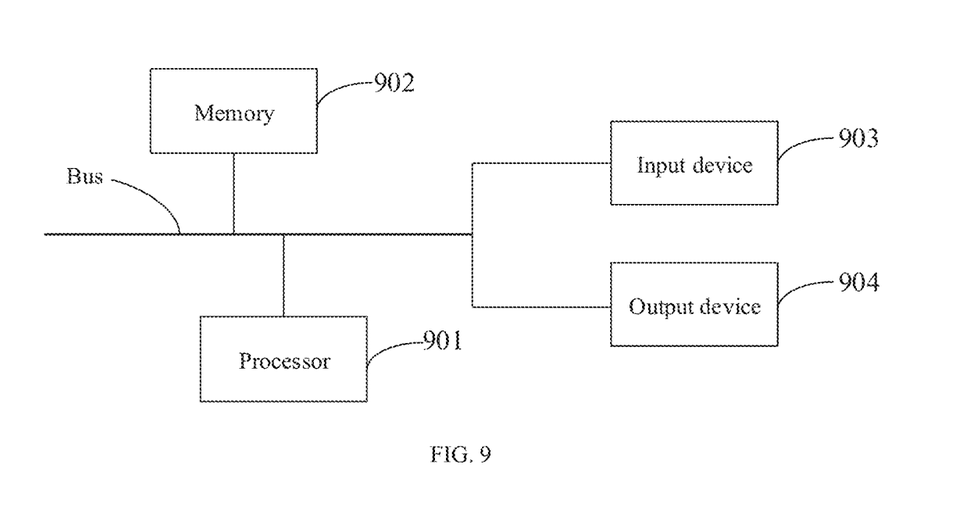
FIG. 9 is a block diagram of an electronic device used to implement the method for displaying annotation information of an embodiment of the present disclosure.

FIG. 9 is a block diagram of an electronic device for implementing the method for displaying annotation information according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 9, the electronic device may include one or more processors 901, a memory 902, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 901 is shown in FIG. 9.

The memory 902 is a non-transitory computer-readable storage medium provided herein. The memory stores instructions executable by at least one processor to cause the at least one processor to execute the method for displaying annotation information provided herein. The non-transitory computer-readable storage medium of the present disclosure stores computer instructions for enabling a computer to execute the method for displaying annotation information provided herein.

The memory 902, as a non-transitory computer-readable storage medium, may be configured to store non-transitory software programs, non-transitory computer executable programs and modules, such as program instructions/modules (e.g., the acquisition module 810, the setup module 820, the display module 830, the determination module 840, the dividing module 850, and the mapping module 860 shown in FIG. 8) corresponding to the method for displaying annotation information in the embodiment of the present disclosure. The processor 901 executes various functional applications and data processing of the server by running the non-transitory software programs, instructions and modules stored in the memory 902, that is, implements the method for displaying annotation information in the above method embodiment.

The memory 902 may include a program storage area and a data storage area, wherein the program storage area may store an operating system, and an application program required for at least one function; and the data storage area may store data created according to the use of the electronic device for implementing the method for displaying annotation information. In addition, the memory 902 may include a high speed random access memory, and may also include a non-transitory memory, such as at least one disk storage device, a flash memory device, or other non-transitory solid state storage devices. In some embodiments, the memory 902 may optionally include memories remotely located with respect to the processor 901, and these remote memories may be connected, via a network, to the electronic device for implementing the method for displaying annotation information. Examples of such networks may include, but are not limited to, the Internet, an intranet, a local area network, a mobile communication network and combinations thereof.

The electronic device for implementing the method for displaying annotation information may further include an input device 903 and an output device 904. The processor 901, the memory 902, the input device 903, and the output device 904 may be connected by a bus or in other ways, and the bus connection is taken as an example in FIG. 9.

The input device 903 may receive input digital or character information, and generate a key signal input related to a user setting and a functional control of electronic device for implementing the method for displaying annotation information. For example, the input device may be a touch screen, a keypad, a mouse, a track pad, a touch pad, a pointer stick, one or more mouse buttons, a track ball, a joystick, and other input devices. The output device 904 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

According to an embodiment of the present disclosure, the present disclosure also provides an electronic device. The device may include:
one or more processors; and
a storage for storing one or more programs, and in a case where the one or more programs are executed by the one or more processors, the one or more processors are enabled to implement the method in the above method embodiment.

Among other things, the functions and implementations of the processor and memory of the electronic device may refer to the above description of the processor and memory in the embodiment of the electronic device.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor: the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

According to the technical scheme of the embodiment of the present disclosure, depth information and annotation information of a target region in a first image at a first angle of view are acquired; an association relationship between the depth information and the annotation information is established: in a case that a second image at a second angle of view is acquired, a display region of the target region in the second image is determined based on the depth information, and the annotation information of the target region is displayed in the display region based on an association relationship, the problem that the annotation information of the target region cannot be displayed on the second image due to the fact that the annotation information of the target region is annotated only on the first image but not on the second image is solved, the cross-image display of the annotation information of the target region with the depth information can be realized, and thus the map use experience of the user is improved. In a case that the target region on the first image appears on the second image, the annotation information of the target region on the first image can be displayed on the second image according to the association relationship, thus the problem of less annotation information during panorama browsing can be effectively solved. Compared with an annotation manner adopting a three-dimensional reconstruction technology, the cross-image display problem of annotation information of a key position with depth information in a panorama can be solved at a low cost.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A method for displaying annotation information, comprising:
    acquiring depth information and annotation information of a target region in a first image at a first angle of view;
    establishing an association relationship between the depth information and the annotation information; and
    in a case that a second image at a second angle of view is acquired, determining a display region of the target region in the second image based on the depth information, and displaying, in the display region in the second image, the annotation information of the target region based on the association relationship;
    wherein the method further comprises:
    dividing spherical tiles for a ball model based on a preset granularity, to obtain the ball model comprising a plurality of spherical tiles; and
    mapping all target regions with the depth information in the first image onto the ball model comprising the plurality of spherical tiles, and determining a target spherical tile with the depth information from the plurality of spherical tiles; and
    wherein the establishing the association relationship between the depth information and the annotation information comprises:
    establishing the association relationship between a coordinate of the target spherical tile with the depth information and the annotation information corresponding to the depth information.

2. The method of claim 1, wherein the target region in the first image is determined based on at least one of:
    an optical character recognition algorithm;
    a preset image feature; and
    message information of a user.

3. The method of claim 1, wherein the determining the display region of the target region in the second image based on the depth information, comprises:
    determining the display region of the target region on a ball model of the second image, based on collection coordinate information and collection orientation information of the first image and collection coordinate information and collection orientation information of the second image in combination with the depth information of the target region.

4. The method of claim 1, wherein the determining the display region of the target region in the second image based on the depth information, and the displaying, in the display region in the second image, the annotation information of the target region based on the association relationship, comprises:
    determining a display tile coordinate of the target region on the ball model of the second image according to the coordinate of the target spherical tile with the depth information in the association relationship;

determining the annotation information of the target region according to the annotation information corresponding to the coordinate of the target spherical tile with the depth information in the association relationship; and displaying the annotation information on the display tile coordinate of the ball model of the second image.

5. An electronic device, comprising:

at least one processor; and a memory communicatively connected to the at least one processor; wherein, the memory stores instructions executable by the at least one processor, the instructions being executed by the at least one processor to enable the at least one processor to perform operations of:

acquiring depth information and annotation information of a target region in a first image at a first angle of view;

establishing an association relationship between the depth information and the annotation information; and in a case that a second image at a second angle of view is acquired, determining a display region of the target region in the second image based on the depth information, and displaying, in the display region in the second image, the annotation information of the target region based on the association relationship;

wherein the instructions are executable by the at least one processor to enable the at least one processor further to perform operations of:

dividing spherical tiles for a ball model based on a preset granularity, to obtain the ball model comprising a plurality of spherical tiles; and mapping all target regions with the depth information in the first image onto the ball model comprising the plurality of spherical tiles, and determining a target spherical tile with the depth information from the plurality of spherical tiles; and wherein the establishing the association relationship between the depth information and the annotation information comprises:

establishing the association relationship between a coordinate of the target spherical tile with the depth information and the annotation information corresponding to the depth information.

6. The electronic device of claim 5, wherein the target region in the first image is determined based on at least one of:

an optical character recognition algorithm;

a preset image feature; and message information of a user.

7. The electronic device of claim 5, wherein the determining the display region of the target region in the second image based on the depth information, comprises:

determining the display region of the target region on a ball model of the second image, based on collection coordinate information and collection orientation information of the first image and collection coordinate information and collection orientation information of the second image in combination with the depth information of the target region.

8. The electronic device of claim 5, wherein the determining the display region of the target region in the second image based on the depth information, and the displaying, in the display region in the second image, the annotation information of the target region based on the association relationship, comprises:

determining a display tile coordinate of the target region on the ball model of the second image according to the coordinate of the target spherical tile with the depth information in the association relationship;

determining the annotation information of the target region according to the annotation information corresponding to the coordinate of the target spherical tile with the depth information in the association relationship; and displaying the annotation information on the display tile coordinate of the ball model of the second image.

9. A non-transitory computer-readable storage medium storing computer instructions for enabling a computer to perform operations of:

acquiring depth information and annotation information of a target region in a first image at a first angle of view;

establishing an association relationship between the depth information and the annotation information; and in a case that a second image at a second angle of view is acquired, determining a display region of the target region in the second image based on the depth information, and displaying, in the display region in the second image, the annotation information of the target region based on the association relationship;

wherein the computer instructions are executable by the computer to enable the computer further to perform operations of:

dividing spherical tiles for a ball model based on a preset granularity, to obtain the ball model comprising a plurality of spherical tiles; and mapping all target regions with the depth information in the first image onto the ball model comprising the plurality of spherical tiles, and determining a target spherical tile with the depth information from the plurality of spherical tiles; and wherein the establishing the association relationship between the depth information and the annotation information comprises:

establishing the association relationship between a coordinate of the target spherical tile with the depth information and the annotation information corresponding to the depth information.

10. The non-transitory computer-readable storage medium of claim 9, wherein the target region in the first image is determined based on at least one of:

an optical character recognition algorithm;

a preset image feature; and message information of a user.

11. The non-transitory computer-readable storage medium of claim 9, wherein the determining the display region of the target region in the second image based on the depth information, comprises:

determining the display region of the target region on a ball model of the second image, based on collection coordinate information and collection orientation information of the first image and collection coordinate information and collection orientation information of the second image in combination with the depth information of the target region.

12. The non-transitory computer-readable storage medium of claim 9, wherein the determining the display region of the target region in the second image based on the depth information, and the displaying, in the display region in the second image, the annotation information of the target region based on the association relationship, comprises:

determining a display tile coordinate of the target region on the ball model of the second image according to the coordinate of the target spherical tile with the depth information in the association relationship;

determining the annotation information of the target region according to the annotation information corresponding to the coordinate of the target spherical tile with the depth information in the association relationship; and displaying the annotation information on the display tile coordinate of the ball model of the second image.

* * * * *